US009352426B2

(12) United States Patent
Pennington et al.

(10) Patent No.: US 9,352,426 B2
(45) Date of Patent: May 31, 2016

(54) METHOD AND MACHINE FOR ASSEMBLING A PROPSHAFT ASSEMBLY

(71) Applicants: Brian Pennington, Clio, MI (US); Jeremy Clontz, Clio, MI (US); Britten Coleman, Clio, MI (US); Scott Schmidt, Detroit, MI (US)

(72) Inventors: Brian Pennington, Clio, MI (US); Jeremy Clontz, Clio, MI (US); Britten Coleman, Clio, MI (US); Scott Schmidt, Detroit, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 0 days.

(21) Appl. No.: 14/461,722

(22) Filed: Aug. 18, 2014

(65) Prior Publication Data

US 2015/0128401 A1 May 14, 2015

Related U.S. Application Data

(62) Division of application No. 14/179,773, filed on Feb. 13, 2014, now Pat. No. 8,832,941.

(60) Provisional application No. 61/904,129, filed on Nov. 14, 2013.

(51) Int. Cl.
| | |
|---|---|
| *B23P 11/02* | (2006.01) |
| *F16F 15/20* | (2006.01) |
| *F16C 3/02* | (2006.01) |
| *B23P 19/04* | (2006.01) |
| *B60K 17/22* | (2006.01) |

(52) U.S. Cl.
CPC ............ *B23P 11/02* (2013.01); *B23P 19/04* (2013.01); *B60K 17/22* (2013.01); *F16C 3/023* (2013.01); *F16F 15/20* (2013.01); *B23P 2700/50* (2013.01); *F16F 2226/04* (2013.01); *Y10T 29/49622* (2015.01); *Y10T 29/49872* (2015.01); *Y10T 29/49938* (2015.01); *Y10T 29/53657* (2015.01); *Y10T 29/53687* (2015.01); *Y10T 464/50* (2015.01)

(58) Field of Classification Search
CPC .............. Y10T 29/49622; Y10T 29/49863; Y10T 29/49872; Y10T 29/49938; Y10T 29/49998; Y10T 29/53652; Y10T 29/53657; Y10T 29/53687; Y10T 29/53796; Y10T 29/53826–29/53848; Y10T 29/53896; Y10T 29/53909; Y10T 29/53943; Y10T 29/53952; Y10T 29/53961; Y10T 29/53987; B23P 11/00; B23P 11/02; B23P 17/00; B23P 17/02; B23P 19/00; B23P 19/02; B23P 19/027; B23P 19/04; B23P 23/00; B23P 2700/50; B30B 7/04; B30B 12/00; B30B 13/00; F16C 2326/06; F16F 15/10; F16F 15/1407–15/1492; F16F 2226/045
See application file for complete search history.

(56) References Cited

U.S. PATENT DOCUMENTS

| | | | |
|---|---|---|---|
| 2,001,166 | A | 5/1935 | Swennes |
| 2,751,765 | A | 6/1956 | Rowland et al. |
| 3,052,107 | A | 6/1956 | Kempf |
| 3,592,884 | A | 7/1971 | Williams |

(Continued)

*Primary Examiner* — Ryan J Walters
*Assistant Examiner* — Matthew P Travers
(74) *Attorney, Agent, or Firm* — Harness, Dickey & Pierce, P.L.C.

(57) ABSTRACT

A method for assembling a propshaft assembly. The method can include: providing a tubular member, the tubular member having an annular wall with an inside circumferential surface; twisting a damper; installing the twisted damper in the tubular member; untwisting the damper in the tubular member such that the damper engages the inside circumferential surface of the annular wall. A machine for assembling a propshaft assembly is also provided.

19 Claims, 4 Drawing Sheets

(56) References Cited

U.S. PATENT DOCUMENTS

| | | |
|---|---|---|
| 4,014,184 A | 3/1977 | Stark |
| 4,043,147 A | 8/1977 | Wiebe |
| 4,124,928 A | 11/1978 | Stark |
| 4,844,193 A | 7/1989 | Veselica et al. |
| 4,909,361 A | 3/1990 | Stark et al. |
| 5,056,763 A | 10/1991 | Hamada et al. |
| 5,115,546 A * | 5/1992 | Mitsukuchi et al. .......... 29/27 C |
| 5,243,880 A | 9/1993 | Beier et al. |
| 5,287,768 A | 2/1994 | Amborn et al. |
| 5,326,324 A | 7/1994 | Hamada |
| 5,566,721 A | 10/1996 | Breese |
| 5,868,627 A | 2/1999 | Stark et al. |
| 5,904,622 A | 5/1999 | Breese et al. |
| 5,924,531 A | 7/1999 | Stark et al. |
| 5,976,021 A | 11/1999 | Stark et al. |
| 5,983,497 A | 11/1999 | Breese et al. |
| 6,023,830 A | 2/2000 | Cole et al. |
| 6,234,911 B1 | 5/2001 | Breese et al. |
| 6,312,340 B1 | 11/2001 | Gassen et al. |
| 6,319,134 B1 | 11/2001 | Menosky et al. |
| 6,370,756 B1 | 4/2002 | Conger et al. |
| 6,409,606 B1 | 6/2002 | Nakajima et al. |
| 6,428,017 B1 | 8/2002 | Galonska et al. |
| 6,527,644 B2 | 3/2003 | Glowacki et al. |
| 6,623,365 B1 | 9/2003 | Maretzke et al. |
| 6,725,985 B2 | 4/2004 | Haneishi et al. |
| 6,752,722 B2 | 6/2004 | Armitage et al. |
| 6,793,050 B2 | 9/2004 | Nylander et al. |
| 6,837,345 B1 | 1/2005 | Lauble et al. |
| 6,874,228 B2 | 4/2005 | Armitage et al. |
| 6,889,803 B2 | 5/2005 | Schankin et al. |
| 6,966,413 B2 | 11/2005 | Haneishi et al. |
| 6,989,713 B2 | 1/2006 | Matsuura et al. |
| 7,083,523 B2 | 8/2006 | Haile et al. |
| 7,134,964 B2 | 11/2006 | Dine et al. |
| 7,192,357 B2 | 3/2007 | Kawakami |
| 7,204,762 B2 | 4/2007 | Campbell |
| 7,214,135 B2 | 5/2007 | Laskey et al. |
| 7,320,381 B2 | 1/2008 | Patrascu et al. |
| 7,416,491 B2 | 8/2008 | Campbell et al. |
| 7,438,612 B2 | 10/2008 | Wada et al. |
| 7,533,756 B2 | 5/2009 | Patrascu et al. |
| 7,549,927 B2 | 6/2009 | Haile et al. |
| 7,713,132 B2 | 5/2010 | Habara |
| 7,749,086 B2 | 7/2010 | Toita |
| 7,774,911 B2 | 8/2010 | Sun et al. |
| 2006/0276250 A1 | 12/2006 | Tkacik et al. |
| 2006/0276251 A1 | 12/2006 | Tkacik et al. |
| 2006/0276252 A1 | 12/2006 | Tkacik et al. |
| 2009/0048031 A1 | 2/2009 | Conger et al. |

\* cited by examiner

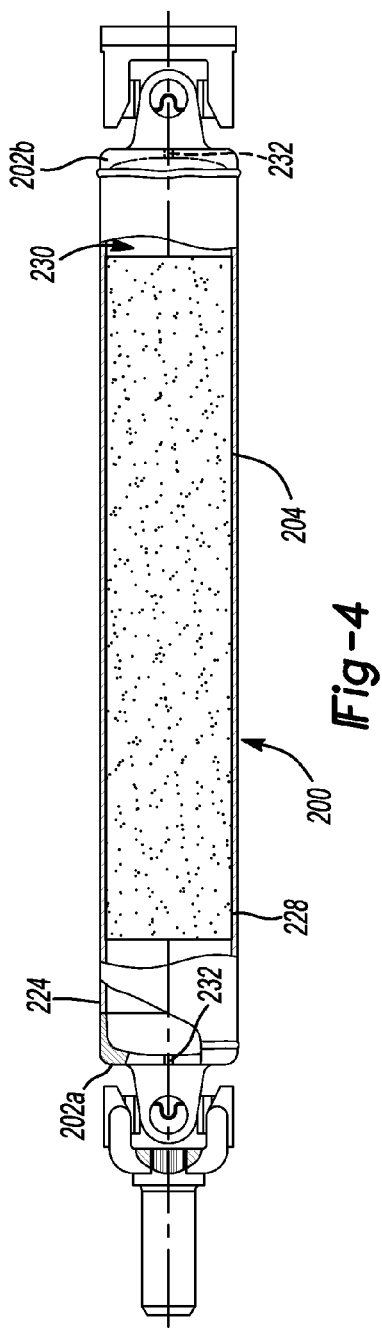
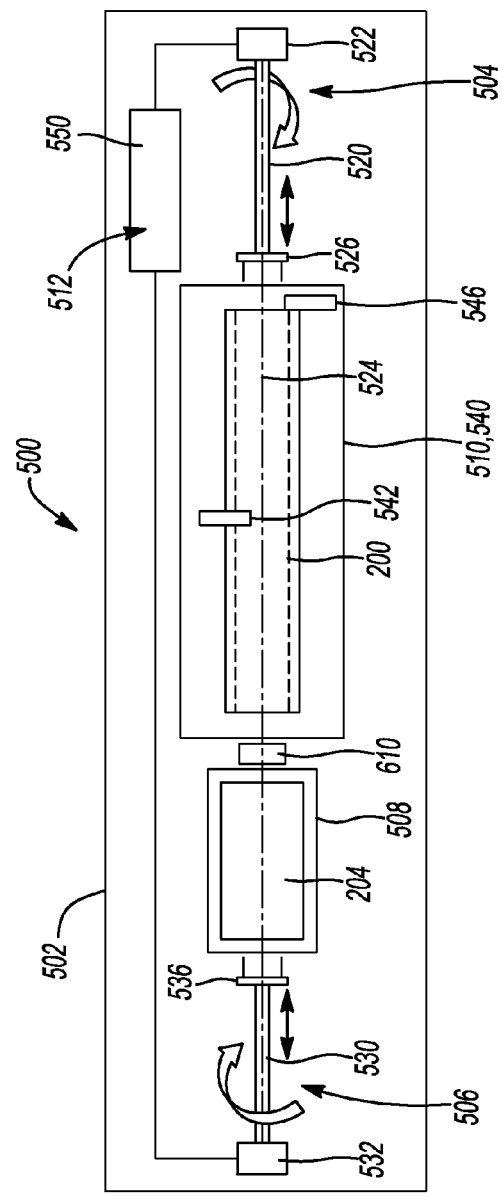
Fig-4
Fig-5

METHOD AND MACHINE FOR ASSEMBLING A PROPSHAFT ASSEMBLY

CROSS-REFERENCE TO RELATED APPLICATIONS

This application is a division of U.S. patent application Ser. No. 14/179,773 filed Feb. 13, 2014, which claims the benefit of U.S. Provisional Patent Application No. 61/904,129 filed Nov. 14, 2013. The disclosures of the above-referenced applications are incorporated by reference as if fully set forth in detail herein.

FIELD

The present disclosure relates to a method and a machine for assembling a propshaft assembly.

BACKGROUND

This section provides background information related to the present disclosure which is not necessarily prior art.

The consumers of modern automotive vehicles are increasingly influenced in their purchasing decisions and in their opinions of the quality of a vehicle by their satisfaction with the vehicle's sound quality. In this regard, consumers increasingly expect the interior of the vehicle to be quiet and free of noise from the power train and drive line. Consequently, vehicle manufacturers and their suppliers are under constant pressure to reduce noise to meet the increasingly stringent expectations of consumers.

Drive line components and their integration into a vehicle typically play a significant role in sound quality of a vehicle as they can provide the forcing function that excites specific driveline, suspension and body resonances to produce noise. Since this noise can be tonal in nature, it is usually readily detected by the occupants of a vehicle regardless of other noise levels. Common driveline excitation sources can include driveline imbalance and/or run-out, fluctuations in engine torque, engine idle shake, and motion variation in the meshing gear teeth of the hypoid gear set (i.e., the pinion gear and the ring gear of a differential assembly).

Propshafts are typically employed to transmit rotary power in a drive line. Modern automotive propshafts are commonly formed of relatively thin-walled steel or aluminum tubing and as such, can be receptive to various driveline excitation sources. The various excitation sources can typically cause the propshaft to vibrate in a bending (lateral) mode, a torsion mode and a shell mode. Bending mode vibration is a phenomenon wherein energy is transmitted longitudinally along the shaft and causes the shaft to bend at one or more locations. Torsion mode vibration is a phenomenon wherein energy is transmitted tangentially through the shaft and causes the shaft to twist. Shell mode vibration is a phenomenon wherein a standing wave is transmitted circumferentially about the shaft and causes the cross-section of the shaft to deflect or bend along one or more axes.

Several techniques have been employed to attenuate vibrations in propshafts including the use of foam inserts. U.S. Pat. No. 6,752,722 to Armitage, et al. for example discloses the use of a pair of foam insert members that are inserted into a propshaft tube and located at the second bending mode antinodes. It is known in the art to employ a vacuum to install foam inserts into a propshaft tube. The installation of the foam insert(s) into a propshaft tube can be time consuming and may not be capable of locating the foam insert(s) in as precise a manner as desired.

SUMMARY

This section provides a general summary of the disclosure, and is not a comprehensive disclosure of its full scope or all of its features.

In one form, the present teachings provide a method for assembling a propshaft assembly. The method can include: providing a tubular member, the tubular member having an annular wall with an inside circumferential surface; pushing a first ram through the tubular member; loading a damper between the first ram and a second ram; twisting the damper between the first and second rams; moving the first and second rams to translate the twisted damper into the tubular member; untwisting the damper in the tubular member; and withdrawing the first and second rams from the tubular member.

In another form, the present teachings provide a propshaft assembly machine that includes a tube holder, a headstock, a tailstock and a controller. The tube holder is configured to hold the tubular member such that a longitudinal axis of the tubular member is coincident with a central axis. The headstock has a first ram that is movable along the central axis. The tailstock has a second ram that is movable along the central axis. The controller is configured to coordinate movement of the first and second rams. At least one of the first and second rams is rotatable about the central axis to cause the damper to be twisted between the first and second rams. The controller can coordinate translation of the first and second rams to cause the damper to be installed into the tubular member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a top, partially cut away view of the propshaft assembly;

FIG. 5 is a schematic view of an assembly machine that is configured to compress a damper and install the damper to a tubular member of the propshaft assembly in accordance with the teachings of the present disclosure.

Corresponding reference numerals indicate corresponding parts throughout the several views of the drawings.

DETAILED DESCRIPTION

Figure 1:
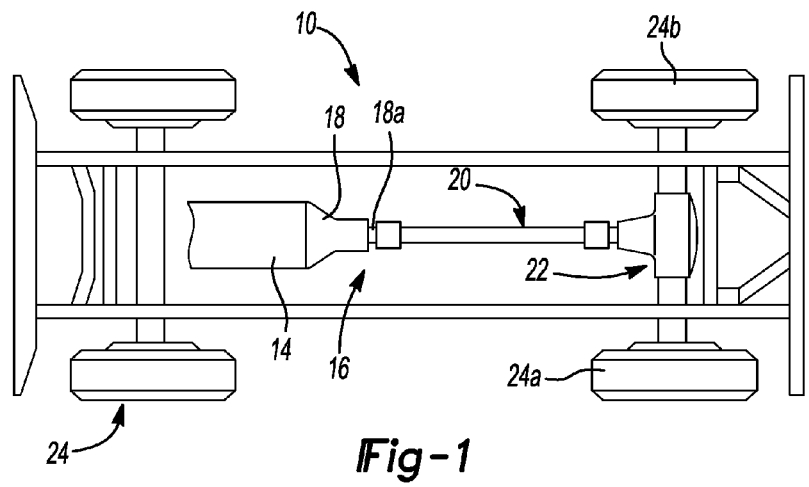
FIG. 1 is a schematic illustration of an exemplary vehicle having a propshaft assembly constructed in accordance with the teachings of the present disclosure.

With reference to FIG. 1 of the drawings, an exemplary vehicle constructed in accordance with the teachings of the present disclosure is generally indicated by reference numeral 10. The vehicle 10 can include an engine 14 and a drive line 16. The drive line 16 can include a transmission 18, a propshaft assembly 20, a rear axle 22 and a plurality of wheels 24. The engine 14 can produce rotary power that can be transmitted to the transmission 18 in a conventional and well known manner. The transmission 18 can be conventionally configured and can include a transmission output shaft 18a and a gear reduction unit (not specifically shown). As is well known in the art, the gear reduction unit can change the speed and torque of the rotary power provided by the engine such that a rotary output of the transmission 18 (which can be transmitted through the transmission output shaft 18a) can have a relatively lower speed and higher torque than that which was input to the transmission 18. The propshaft assembly 20 can be coupled for rotation with the transmission output member 18a to permit drive torque to be transmitted from the transmission 18 to the rear axle 22 where can be selectively apportioned in a predetermined manner to the left and right rear wheels 24a and 24b, respectively.

It will be appreciated that while the vehicle in the particular example provided employs a drive line with a rear-wheel drive arrangement, the teachings of the present disclosure have broader applicability. In this regard, a shaft assembly constructed in accordance with the teachings of the present disclosure may interconnect a first drive line component with a second drive line component to transmit torque therebetween. In the context of an automotive vehicle, the drive line components could be a transmission, a transfer case, a viscous coupling, an axle assembly, or a differential, for example.

Figure 2:
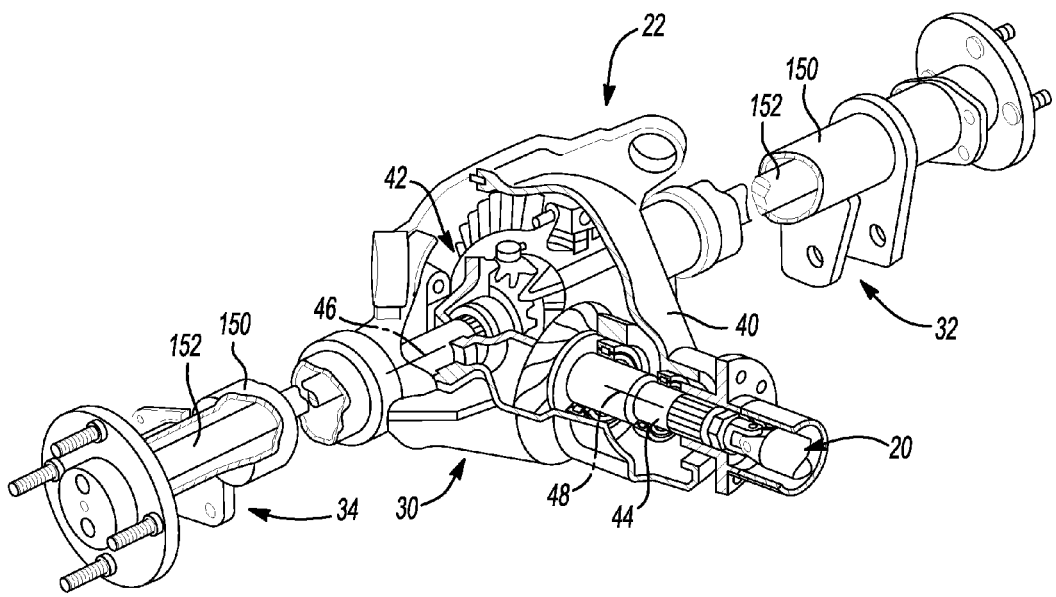
FIG. 2 is a top partially cut-away view of a portion of the vehicle of FIG. 1 illustrating a rear axle and the propshaft assembly in greater detail.

With reference to FIG. 2, the rear axle 22 can include a differential assembly 30, a left axle shaft assembly 32 and a right axle shaft assembly 34. The differential assembly 30 can include a housing 40, a differential unit 42 and an input shaft assembly 44. The housing 40 can support the differential unit 42 for rotation about a first axis 46 and can further support the input shaft assembly 44 for rotation about a second axis 48 that is perpendicular to the first axis 46.

Figure 3:
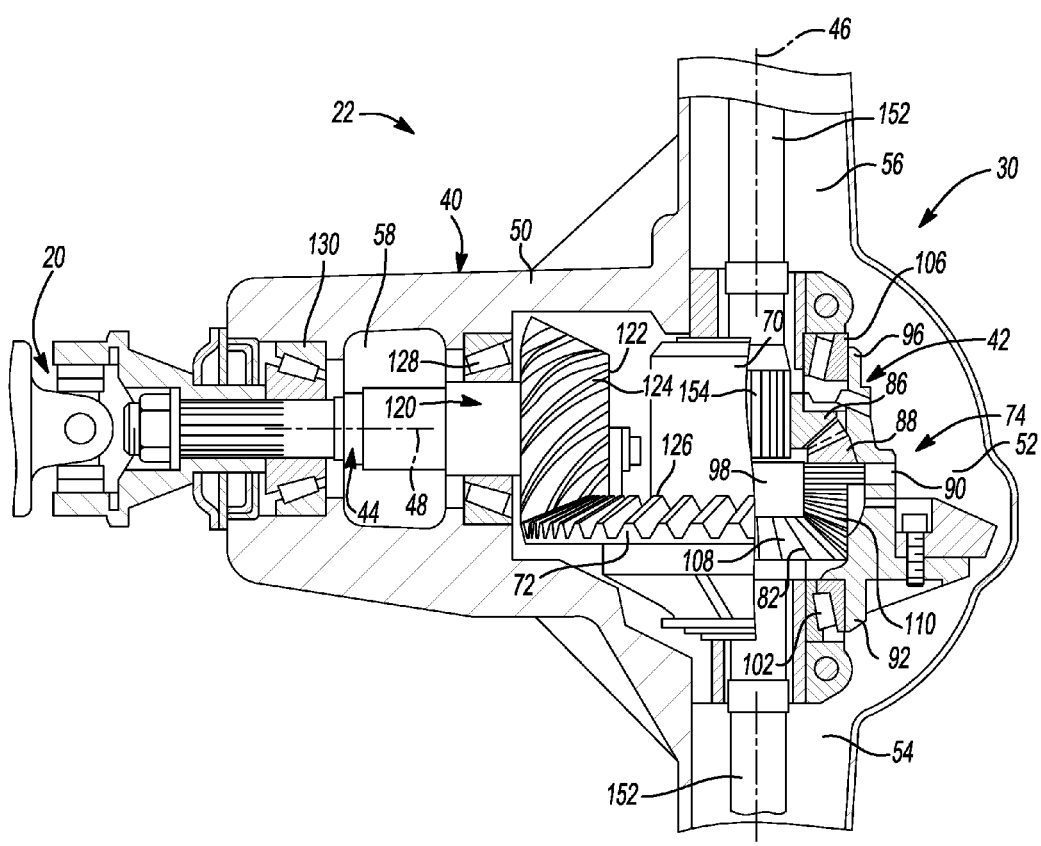
FIG. 3 is a sectional view of a portion of the rear axle and the propshaft assembly.

With additional reference to FIG. 3, the housing 40 can be formed in a suitable casting process and thereafter machined as required. The housing 40 can include a wall member 50 that can define a central cavity 52 that can have a left axle aperture 54, a right axle aperture 56, and an input shaft aperture 58. The differential unit 42 can be disposed within the central cavity 52 of the housing 40 and can include a case 70, a ring gear 72, which can be fixed for rotation with the case 70, and a gearset 74 that can be disposed within the case 70. The gearset 74 can include first and second side gears 82 and 86 and a plurality of differential pinions 88, which can be rotatably supported on pinion shafts 90 that can be mounted to the case 70. The case 70 can include a pair of trunnions 92 and 96 and a gear cavity 98. A pair of bearing assemblies 102 and 106 can support the trunnions 92 and 96, respectively, for rotation about the first axis 46. The left and right axle assemblies 32 and 34 can extend through the left and right axle apertures 54 and 56, respectively, where they can be coupled for rotation about the first axis 46 with the first and second side gears 82 and 86, respectively. The case 70 can be operable for supporting the plurality of differential pinions 88 for rotation within the gear cavity 98 about one or more axes that can be perpendicular to the first axis 46. The first and second side gears 82 and 86 each include a plurality of teeth 108 which meshingly engage teeth 110 that are formed on the differential pinions 88.

The input shaft assembly 44 can extend through the input shaft aperture 58 where it can be supported in the housing 40 for rotation about the second axis 48. The input shaft assembly 44 can include an input shaft 120, a pinion gear 122 having a plurality of pinion teeth 124 that meshingly engage the teeth 126 that are formed on the ring gear 72, and a pair of bearing assemblies 128 and 130 that can cooperate with the housing 40 to rotatably support the input shaft 120. The input shaft assembly 44 can be coupled for rotation with the propshaft assembly 20 and can be operable for transmitting drive torque to the differential unit 42. More specifically, drive torque received the input shaft 120 can be transmitted by the pinion teeth 124 to the teeth 126 of the ring gear 72 such that drive torque is distributed through the differential pinions 88 to the first and second side gears 82 and 86.

The left and right axle shaft assemblies 32 and 34 can include an axle tube 150 that can be fixed to the associated axle aperture 54 and 56, respectively, and an axle half-shaft 152 that can be supported for rotation in the axle tube 150 about the first axis 46. Each of the axle half-shafts 152 can include an externally splined portion 154 that can meshingly engage a mating internally splined portion (not specifically shown) that can be formed into the first and second side gears 82 and 86, respectively.

With reference to FIG. 4, the propshaft assembly 20 can include a tubular member 200, a first end connection 202a, a second end connection 202b, and a damper 204. The tubular member and the first and second end connections 202a and 202b can be conventional in their construction and need not be described in significant detail herein. Briefly, the tubular member 200 can be formed of an appropriate structural material, such as steel or aluminum, and can include an annular wall member 224. The annular wall member 224 can have an interior circumferential surface 228 and can define a hollow cavity 230. Depending on the particular requirements of the vehicle 10 (FIG. 1), the wall member 224 may be sized in a uniform manner over its entire length, as is shown in FIG. 4, or may be necked down or stepped in diameter in one or more areas along its length. The first and second end connections 202a and 202b can be configured to couple the propshaft assembly 20 to other rotary components of the vehicle 10 (FIG. 1) in a desired manner to transmit rotary power therebetween. For example, the first end connection 202a and/or the second end connection 202b could comprise a universal joint (e.g., Cardan or constant velocity joint) or components thereof that can be fixedly coupled to the tubular member 200. For example, the first and second end connections 202a and 202b could comprise weld yokes that are welded to the opposite ends of the tubular member 200. Optionally, one or both of the first and second end connections 202a and 202b can be vented to permit air to flow into or out of the hollow cavity 230. In the particular example provided, a vent 232 is installed to each of the first and second end connections 202a and 202b. In the particular example provided, the vents 232 comprise holes formed in the first and second end connections 202a and 202b, but it will be appreciated that the vent(s) 232 can be constructed in any desired manner.

The damper 204 can be effective in attenuating shell mode vibration transmitted through the tubular member 200, but may also be effective in attenuating other vibration modes, such as torsion mode vibration and/or bending mode vibration through the tubular member 200. Shell mode vibration, also known as breathing mode vibration, is a phenomenon wherein a standing wave is transmitted circumferentially about the tubular member 200 and causes the cross-section of the shaft to deflect (e.g., expand or contract) and/or bend along one or more axes. Torsion mode vibration is a phenomenon wherein energy is transmitted tangentially through the shaft and causes the shaft to twist. Bending mode vibration is a phenomenon wherein energy is transmitted longitudinally along the shaft and causes the shaft to bend at one or more locations.

The damper 204 can be formed of a suitable damping material, such as a length of foam or other compressible but resilient material. In the particular example provided, the damper 204 is a length of a cylindrically-shaped closed-cell foam that can be formed of a suitable material. Examples of suitable materials include polyethylene; polyurethane; sponge rubber; PVC and vinyl nitrile blends; PP and nylon foam blends; and melamine, polyimide and silicone. It will be appreciated that various other materials, such as an open-cell foam, or that one or more apertures could be formed longitudinally through the damper 204.

The damper 204 can have an appropriate density, such as between 1.0 pounds per cubic foot to 2.5 pounds per cubic foot, preferably between 1.2 pounds per cubic foot to about 1.8 pounds per cubic foot, and more preferably between 1.20 pounds per cubic foot to 1.60 pounds per cubic foot. In the particular example provided, the damper 204 has a density of 1.45 pounds per cubic foot. The damper 204 can be sized in a manner so that it is compressed against the inside circumferential surface 228 of the tubular member 200 to a desired degree. For example, the damper 204 can have an outer circumferential diameter that is about 5% to about 20% larger than the diameter of the inside circumferential surface 228 of the tubular member 200, and more preferably about 10% larger than the diameter of the inside circumferential surface 228 of the tubular member 200.

The damper 204 can be tuned for a particular vehicle configuration in part by altering one or more characteristics of the damper 204, such as its position relative to the tubular member 200, its length, etc. In the particular example provided, damper is disposed in the middle of the tubular member 200.

The damper 204 can be installed to the tubular member 200 by pre-compressing the damper 204 and then sliding the (compressed) damper 204 into the tubular member 200 such that it is positioned relative to the tubular member in a desired manner. Any means may be employed to compress the damper 204 prior to its insertion into the tubular member 200. In the particular example provided, the damper 204 compressed is twisted to achieve the desired level of compression.

With reference to FIG. 5, an exemplary assembly tool 500 for inserting the damper 204 into the tubular member 200 is illustrated. The assembly tool 500 may be procured from the Cardinal Machine Company of Clio, Mich. The assembly tool 500 can include a base 502, a headstock 504, a tailstock 506, a damper holder 508, a tube holder 510 and a control system 512. The base 502 can be a suitably configured structure to which the headstock 504, the tailstock 506, the damper holder 508 and the tube holder 510 are mounted or coupled. The headstock 504 can include a first ram 520 and a first ram movement mechanism 522 that permits the first ram 520 to be moved in an axial direction along a central axis 524 that is defined by the base 502. The first ram movement mechanism 522 can also permit the first ram 520 to be rotated about the central axis 524. The first ram 520 can include a first end effector 526 that is configured to engage the damper 204 as will be discussed in further detail below.

The tailstock 506 can include a second ram 530 and a second ram movement mechanism 532 that can permit the second ram 530 to be moved in an axial direction along the central axis 524 and rotated about the central axis 524. It will be appreciated that one or both of the first and second rams 520 and 530 may be configured to be driven (by the first and second ram movement mechanisms 522 and 532, respectively) about the central axis 524. The second ram 530 can include a second end effector 536 that is configured to engage the damper 204 as will be discussed in further detail below.

The damper holder 508 can be configured to hold the damper 204 prior to its insertion into the tubular member 200, as well as locate or position the damper 204 relative to the tubular member 200 prior to its insertion into the tubular member 200. The damper holder 508 could comprise any suitable structure, such as a pair of rollers that are mounted to the base 502. In the particular example provided, the damper holder 508 comprises at least a portion of a tubular shell that is configured to cradle the damper 204, as well as to orient the damper 204 such that its longitudinal axis is coincident with the central axis 524. The damper holder 508 can be positioned axially between the headstock 504 and the tailstock 506.

The tube holder 510 can be configured to hold the tubular member 200 prior to and during the assembly process so that a longitudinal axis of the tubular member 200 is coincident with the central axis 524 and the tubular member 200 is position along the central axis 524 in an accurate and repeatable manner. For example, the tube holder 510 can comprise a set of rollers or a portion of a tubular shell 540, which can be coupled to the base 502, a clamping member 542, which can clamp the tubular member 200 against the rollers or tubular shell to inhibit movement of the tubular member 200 relative to the tube holder 510, and a stop member 546 that is fixedly coupled to the base 502. The tubular member 200 can be slid on the tube holder 510 and abutted against the stop member 546 to position the tubular member 200 in a known manner relative to the base 502.

The control system 512 can include a controller 550 that can coordinate the operation of the first and second ram movement mechanisms 522 and 532.

Figure 6:
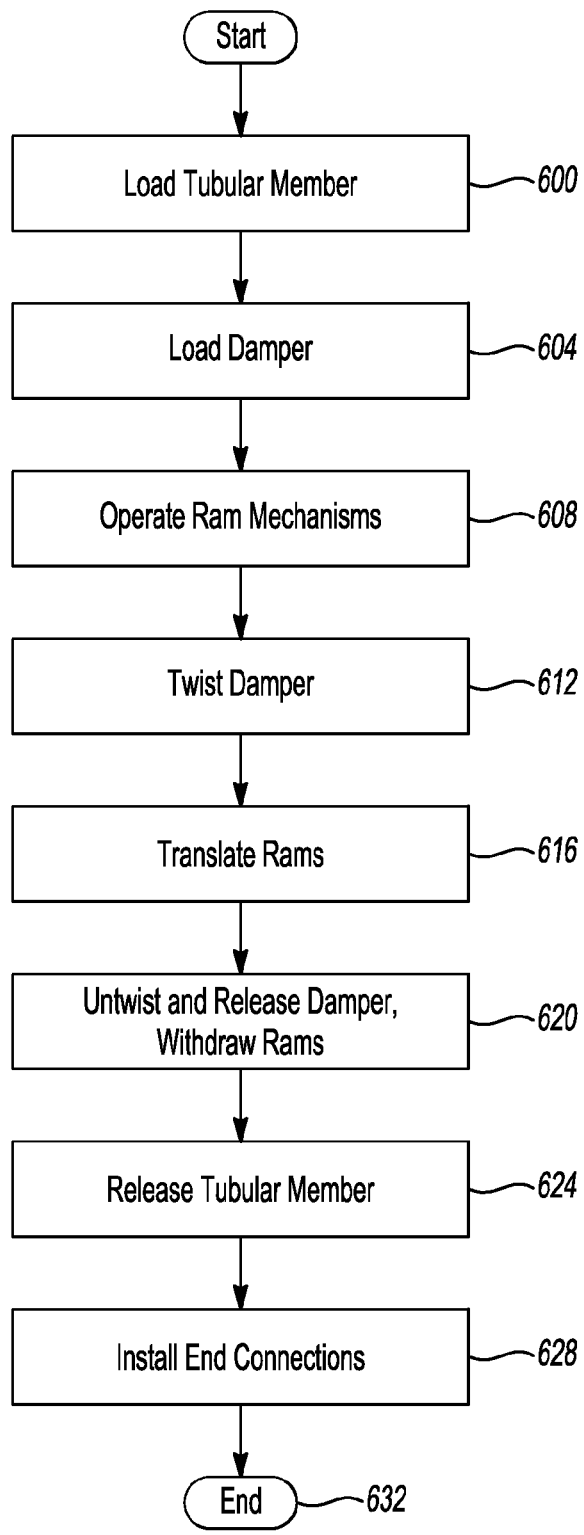
FIG. 6 is schematic view in flow-chart form of an exemplary method for assembling a propshaft assembly in accordance with the teachings of the present disclosure.

With additional reference to FIG. 6, which schematically depicts an exemplary assembly method, the control can proceed to block 600 where the tubular member 200 to the loaded to the tube holder 510. It will be appreciated that the loading of the tubular member 200 to the tube holder 510 can additionally comprise abutting the tubular member 200 to the stop member 546 and clamping or otherwise securing the tubular member 200 to the tube holder 510 to resist axial movement of the tubular member 200 along the central axis 524. Control can proceed to block 604.

In block 604, the damper 204 can be loaded to the damper holder 508 to align the damper to the central axis 524 and optionally to locate or position the damper 204 relative to another structure, such as the base 502 or the tubular member 200. Control can proceed to block 608.

In block 608, control can operate the first and second ram movement mechanisms 522 and 532 such that the first and second end effectors 526 and 536 engage the opposite ends of the damper 204. It will be appreciated that the first ram 520 must extend through the tubular member 200 to engage the damper 204. The first and second end effectors 526 and 536 could be configured with tines or forks to engage the ends of the damper 204, or could be configured to clamp (and compress) the opposite ends of the damper 204. It may be desirable to support one or both of the first and second rams 520 and 530 and/or one or both of the first and second end effectors 526 and 536 prior to engagement of the first and second end effectors 526 and 536 with the damper 204. In the particular example provided, a support 610 is provided between the tubular member 200 and the damper 204 to support the first ram 520 when the first end effector 526 is initially positioned proximate the damper 204. The support 610 can comprise any type of structure, such as a plate or rollers, but in the particular example provided, comprises a V-block that is mounted on a pneumatic cylinder (not specifically shown)

that is mounted to the base 502. The V-block can be normally positioned in a lowered position, which permits the end effector 526 to pass between the tube holder 510 and the damper holder 508, but can be raised to support the distal end of the first ram 520 to ensure alignment of the longitudinal axis of the first ram 520 to the central axis 524. In practice, it may be beneficial to have the V-block engage a positive stop that is mounted in an adjustable manner to the base 502 when the V-block is raised to ensure that the desired alignment between the longitudinal axis of the first ram 520 and the central axis 524 is achieved. Those of skill in the art will appreciate that a similar support (not shown) could be provided to directly support the second ram 530 and/or the second end effector 536. Control can proceed to block 612.

In block 612, control can operate one or both of the first and second ram movement mechanisms 522 and 532 to twist the damper 204 to a point where the outside diameter of the damper 204 is smaller than the inside diameter of the annular wall member 224 (FIG. 4) that forms the tubular member 200. In the particular example provided, the damper 204 is twisted to reduce its outside diameter from about 6.38 inches (162 mm) to about 4.0 inches (102 mm). Control can proceed to block 616.

In block 616, control can operate the first and second ram movement mechanisms 522 and 532 to translate the (twisted) damper 204 along the central axis 524 and position the damper 204 along the length of the tubular member 200 in a desired manner. Control can proceed to block 620.

In block 620, control can operate one or both of the first and second ram movement mechanisms 522 and 532 to untwist the damper 204 and to thereafter release the damper 204 and withdraw the rams 520 and 530 from the tubular member 200. Once untwisted, the damper 204 will expand and engage the inner circumferential surface 228 (FIG. 4) of the annular wall member 224 (FIG. 4). Control can proceed to block 624 where the tubular member 200 can be unclamped or released from the tube holder 510 and the intermediate assembly, which consists of the damper 204 installed to the tubular member 200, can be removed from the assembly tool 500. Control can proceed to block 628, where the first and second end connections 202a and 202b (FIG. 4) can be coupled to respective ends of the tubular member 200 to form the propshaft assembly 20 (FIG. 4). Control can proceed to bubble 632, where control can terminate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A machine for assembling a damper into a tubular member, the machine comprising:
   a tube holder that is adapted to hold the tubular member such that a longitudinal axis of the tubular member is coincident with a central axis;
   a headstock having a first ram that is movable along the central axis, the first ram having a first end effector that is configured to engage the damper;
   a tailstock having a second ram that is movable along the central axis, the second ram having a second end effector that is configured to engage the damper; and
   a controller for coordinating movement of the first and second rams along the central axis;
   wherein at least one of the first and second rams is rotatable about the central axis relative to the other of the first and second rams, and wherein the controller coordinates movement of the first and second rams such that: a) the second ram is moved through the tube holder; b) the at least one of the first and second rams is rotated about the central axis to cause relative rotation between the first and second rams after the second ram is moved through the tube holder; and c) the first and second rams are moved together into the tube holder after the at least one of the first and second rams is rotated about the central axis.

2. The machine of claim 1, wherein the end effector is selected from a group of end effectors that consists of tines and clamps.

3. The machine of claim 1, wherein the first and second rams are rotatable in opposite rotational directions.

4. A method for assembling a propshaft assembly, the method comprising:
   providing a tubular member, the tubular member having an annular wall with an inside circumferential surface;
   coupling a first end of a damper to a first stock member and a second end of the damper to a second stock member;
   twisting the damper by rotating a portion of at least one of the first stock member and the second stock member relative to the damper;
   installing the twisted damper in the tubular member by actuating a first ram to translate the twisted damper relative to the tubular member; and
   untwisting the damper in the tubular member such that the damper engages the inside circumferential surface of the annular wall.

5. The method of claim 4, wherein twisting the damper comprises rotating the first ram relative to the tubular member.

6. The method of claim 5, wherein twisting the damper further comprises rotating a second ram relative to the tubular member.

7. The method of claim 4, wherein when the damper is twisted, the damper is compressed such that an outside diameter of the damper is smaller than a diameter of the inside circumferential surface.

8. The method of claim 4, wherein the damper sealingly engages the inside circumferential surface after the damper is untwisted.

9. The method of claim 8, wherein the damper is formed of closed cell foam.

10. The method of claim 4, wherein prior to installing the twisted damper in the tubular member, the method comprises securing the tubular member to a tube holder to inhibit movement of the tubular member relative to the tube holder.

11. The method of claim 4, further comprising coupling a first end connection to the tubular member to substantially close a first end of the tubular member.

12. The method of claim 11, further comprising coupling a second end connection to the tubular member to substantially close a second end of the tubular member.

13. The method of claim 12, wherein the second end connection comprises a weld yoke that is welded to the second end of the tubular member.

14. The method of claim 12, wherein the second end connection is coupled to the second end of the tubular member after the damper is installed in the tubular member.

15. The method of claim 14, wherein the first end connection is coupled to the first end of the tubular member after the damper is installed in the tubular member.

16. The method of claim 12, wherein the second end connection comprises at least a component of a universal joint.

17. The method of claim 11, wherein the first end connection comprises a weld yoke that is welded to the first end of the tubular member.

18. The method of claim 11, wherein the first end connection comprises at least a portion of a universal joint.

19. The method of claim 4, wherein the annular wall of the tubular member is sized in a uniform manner over its entire length so that the tubular member is shaped as a hollow cylinder.

* * * * *